United States Patent
Gibson et al.

[15] 3,650,444
[45] Mar. 21, 1972

[54] COMMUNICATIONS EQUIPMENT MOUNTING ASSEMBLY

[72] Inventors: Elmer B. Gibson, Northbrook; Eric K. Stark, Palatine, both of Ill.

[73] Assignee: SCM Corporation, New York, N.Y.

[22] Filed: Mar. 10, 1970

[21] Appl. No.: 18,147

[52] U.S. Cl. .................224/42.42 R, 214/42.43, 325/15
[51] Int. Cl. ...................................................B60r 11/02
[58] Field of Search................224/29, 42.11, 42.42 R; 325/15

[56] References Cited

UNITED STATES PATENTS

| | | | |
|---|---|---|---|
| 3,061,394 | 10/1962 | Whetstone | 224/42.42 R |
| 3,311,276 | 3/1967 | Fromm | 224/42.11 |
| 3,550,001 | 12/1970 | Hanley | 325/15 |
| 3,405,944 | 10/1968 | Krechman | 224/42.11 |

Primary Examiner—Gerald M. Forlenza
Assistant Examiner—Lawrence J. Oresky
Attorney—Mason, Kolehmainen, Rathburn & Wyss

[57] ABSTRACT

There is disclosed a mounting assembly for mounting teleprinter equipment and communications control equipment such as radio, selective call, and siren controls. The mounting assembly, which can be secured to the floor of a vehicle such as an automobile, has support means in the form of a shelf which extends into overlying relationship with respect to seat structure. In one embodiment of the invention, the mounting assembly is provided mainly by a contoured plastic shell constructed of two plastic shell sections, and in another embodiment of the invention the mounting assembly is provided by a plate-like member and upper and lower sections secured to opposite sides of the plate-like member, the lower section being secured to the vehicle floor.

4 Claims, 12 Drawing Figures

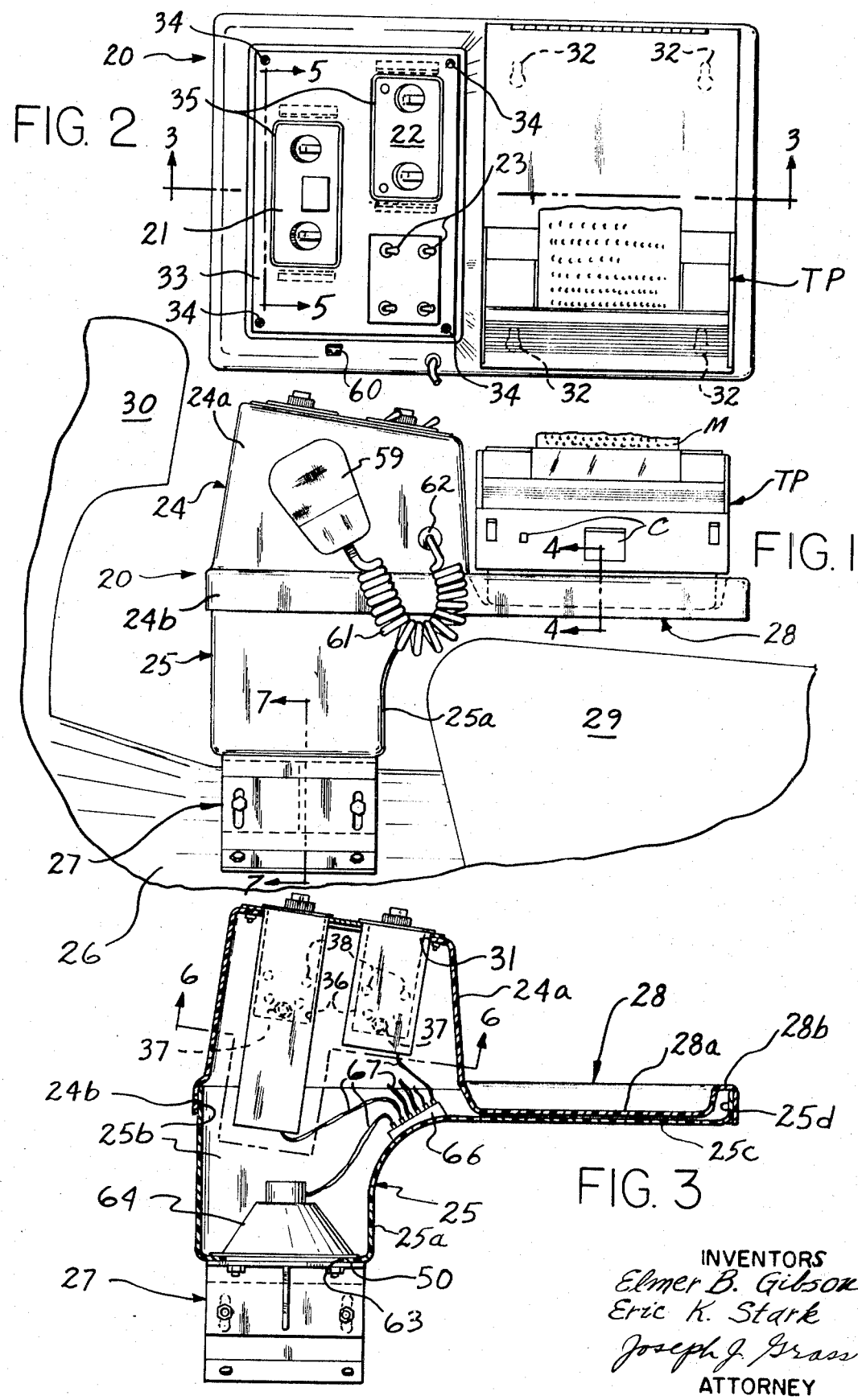

COMMUNICATIONS EQUIPMENT MOUNTING ASSEMBLY

This invention relates to the art of mounting assemblies for communications equipment.

SUMMARY OF THE INVENTION

The primary purpose of the invention is to provide a relatively inexpensive, easily manufacturable, mounting assembly for communications equipment for use in a vehicle such as an automobile. Communications control equipment is mounted in the assembly in a position forward of the instrument panel and a teleprinter is mounted by the assembly forward of the communications control equipment. As such the assembly is essentially entirely out from under the instrument panel. Preferably the teleprinter is close to the driver of the vehicle in a position over the seat structure and is positioned so that the printed message can be easily read. In one embodiment of the invention, there is provided a plastic shell which can be readily formed by any suitable commercial process such as vacuum forming or injection molding. The shell is preferably constructed of a pair of shell sections secured to each other. One portion of the shell houses communications control equipment such as a radio control head, a siren control, a selective call unit, switches, and a plug-in type terminal board, and another portion of the shell provides a support in the form of a shelf capable of mounting a teleprinter or other equipment. The shelf has a flange which serves to add strength and provides a recess in which equipment can be received. The shell specifically comprises an upper shell section and a lower section. The upper shell section mounts the communications control equipment and the lower shell section is secured to the vehicle floor by adjustable legs. In another embodiment of the invention, the assembly is constructed using a platelike member. An upper section is mounted on the upper side of the platelike member and houses communications control equipment, a lower section is secured to the lower side of the platelike member, and adjustable legs mount the lower section to the vehicle floor. An opening in the platelike member enables the communications control equipment to extend into the lower section.

BRIEF DESCRIPTION OF THE DRAWINGS

FIG. 1 is a side elevational view showing a fragmentary portion of an automobile including portions of the vehicle floor, instrument panel and seat structure, together with a communications equipment mounting assembly and various communications equipments;

FIG. 2 is a top plan view of the mounting assembly and equipments shown in FIG. 1;

FIG. 3 is an elevational view, mainly in section, showing the mounting assembly and some of the equipment shown in FIGS. 1 and 2;

DETAILED DESCRIPTION OF THE PREFERRED EMBODIMENTS

Figure 4:
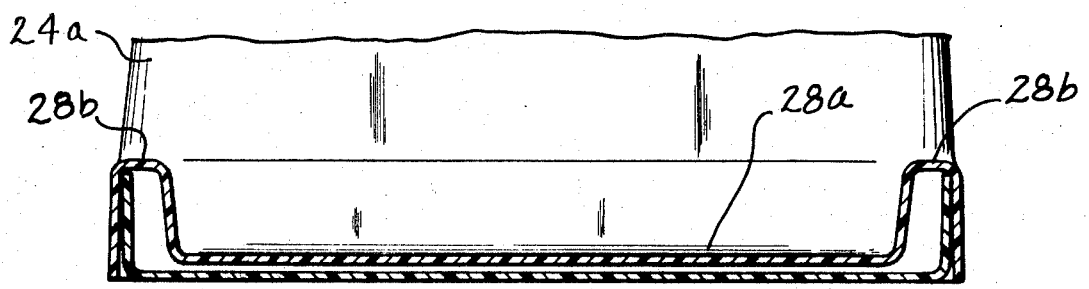
FIG. 4 is a sectional view taken along line 4—4 of FIG. 3.

Referring to the embodiment of FIGS. 1 through 9 of the drawings and in particular to FIGS. 1, 2, and 3, there is shown a mounting assembly generally indicated at 20 for mounting communications control equipment such as a radio control head 21, a siren control 22, and switches 23; a selective call unit and other selected devices (not shown) can also be mounted by the assembly 20. The assembly 20 is shown to include a contoured plastic shell having an upper plastic shell section 24 and a lower plastic shell section 25. Lower section 25 is shown to be secured to the vehicle floor 26 at the "hump" by bracket or leg structure generally indicated at 27.

The mounting assembly 20 is shown to include equipment support structure in the form of a shelf 28 which is cantilevered with respect to the remainder of the mounting assembly 20. The shelf 28 is shown to be disposed in overlying relationship to seat structure 29 of the automobile. The entire mounting assembly is shown to be disposed generally forward of the instrument panel 30.

The upper shell section 24 is shown to include a communications equipment housing portion 24a having four sides and an access opening 31 at its upper end. The lower end of the equipment housing portion 24a also has an opening. In addition, the upper shell section 24 has a shelf portion 28a which is formed integrally with the housing portion 24a. The shelf portion 28a has a generally U-shaped integral flange 28b shown in detail in FIG. 8, and the housing portion 24a has an offset skirt 24b. The flange 28b and the skirt 24b serve to stiffen the entire upper shell section 24. The shelf portion 28a and its flange 28b provide a recess into which the base of a teleprinter TP is received. As the teleprinter TP is disposed transversely of the vehicle, with its controls C and the printed message M facing the driver of the vehicle, the driver can readily operate the controls C and read the message M while remaining seated erect in the driver's seat. The teleprinter TP can be secured as by screws received in tear-drop-shaped slots 32 in the shelf 28.

Figure 8:
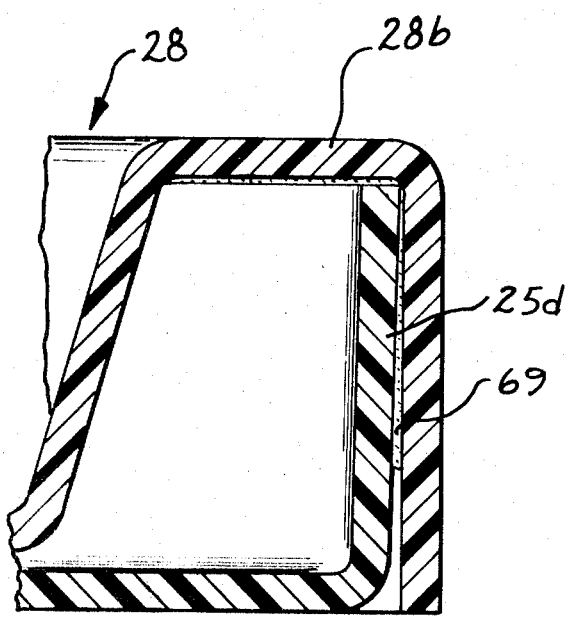
FIG. 8 is a fragmentary view showing the flange structure of the cantilever shelf of the mounting assembly.
Figure 9:
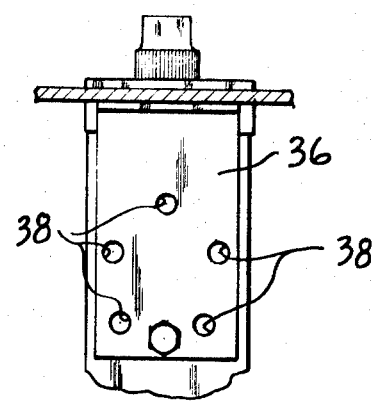
FIG. 9 is a sectional view of a bracket taken generally along line 9—9 of FIG. 5.

The lower shell section 25 is also shown to include a communications equipment housing portion 25a having four side walls 25b and a bottom wall 50. In addition, the lower shell section has a shelf portion 25c which is formed integrally with the housing portion 25a. The shelf portion 25c has an upturned flange 25d which fits into the U-shaped flange 28b, as best shown in FIG. 8. The upper and lower shell sections 24 and 25 are secured to each other at the flange 28b and skirt 24b and at the flange 25b by adhesive 69 or other suitable means.

Figure 5:
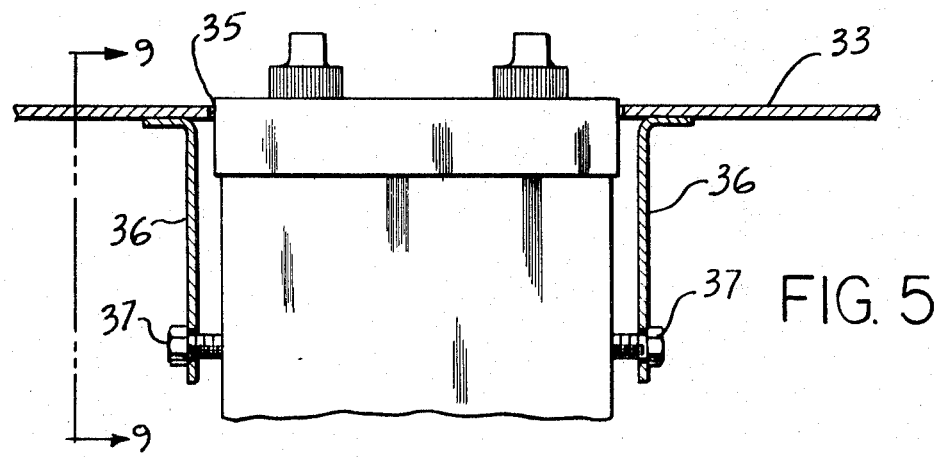
FIG. 5 is a sectional view taken along line 5—5 of FIG. 2.
Figure 6:
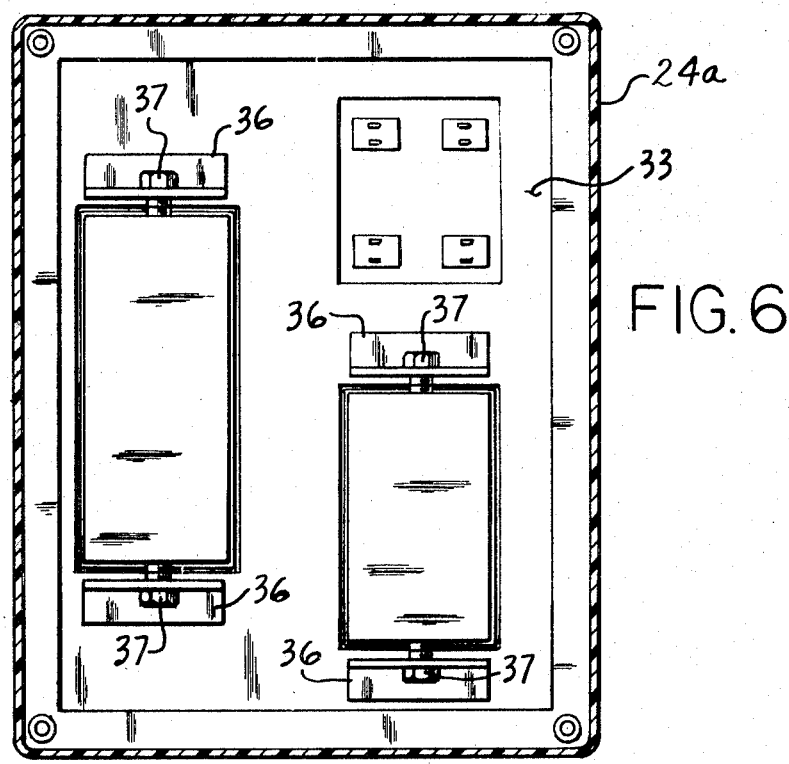
FIG. 6 is a sectional view taken generally along lines 6—6 of FIG. 3.

A rigid metal plate 33 is secured to the housing portion 24a by threaded fasteners 34, and as such the plate 33 closes off the opening 31. The plate 33 has a plurality of openings or cutouts 35 for receiving the various controls such as the radio control head 21, the siren control 22 and the bank of switches 23. The plate 33 is disposed at an angle with respect to the horizontal so that the knobs and buttons of the communications control equipment are easy to see and operate. Parallel brackets 36 are secured, as by welding, to the underside of the plate 33 as best shown in FIGS. 5 and 6. The particular control unit which is used can be securely mounted by means of threaded fasteners 37 which pass through convenient respective apertures 38 in the bracket 36. The brackets 36 are identical in construction. Depending upon the type of control unit which is used, each fastener 37 can fit through any of the apertures 38 which is in alignment with a suitable threaded hole (not shown) in the control unit.

Figure 7:
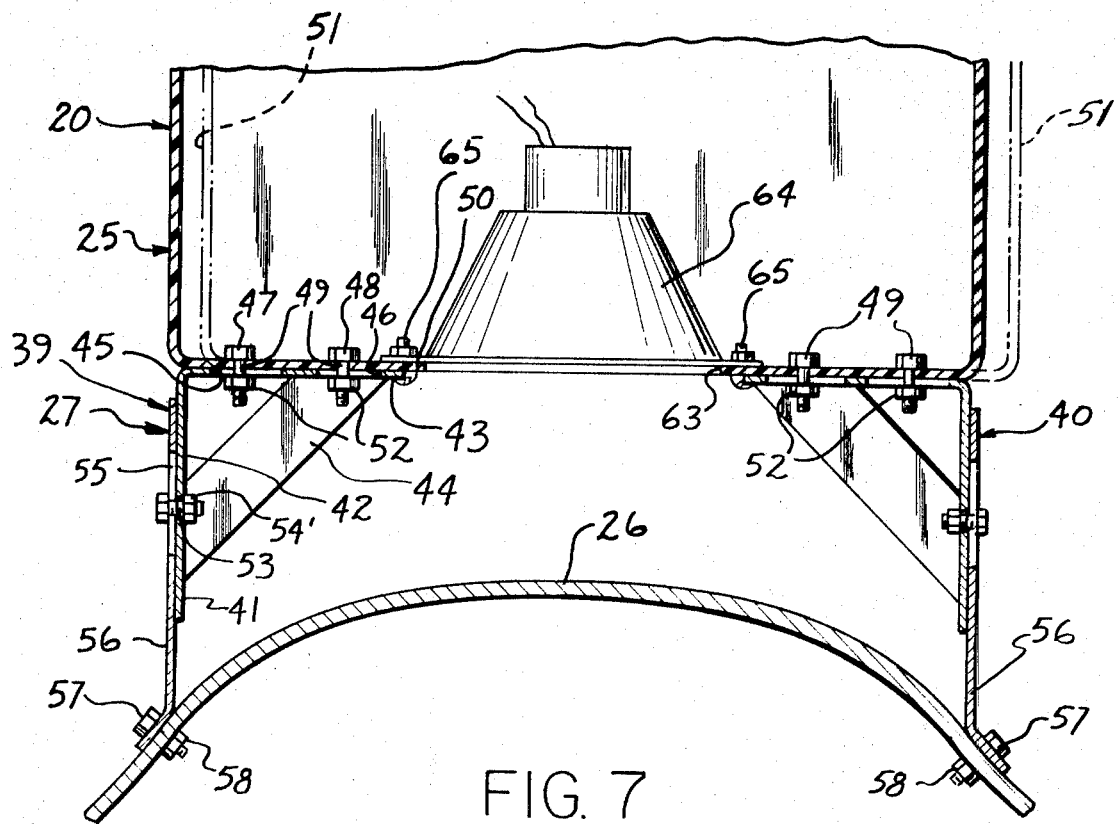
FIG. 7 is a sectional view taken generally along line 7—7 of FIG. 1.

The leg structure 27 is shown in detail in FIGS. 1, 3 and 7. The leg structure 27 includes legs 39 and 40. As the legs 39 and 40 are identical only the leg 39 is described in detail. The leg 39 includes an angle-shaped bracket 41 having a substantially vertical portion 42 and a substantially horizontal portion 43 joined by a brace 44. The portion 43 has elongated slots 45 and 46 which receive bolts 47 and 48. The bolts 47 and 48 pass through apertures 49 in wall 50 of the lower section 25.

The elongated slots 45 and 46 enable the mounting assembly to be shifted to the position indicated by phantom lines 51 (FIG. 7). It is apparent that the mounting assembly 20 can be shifted transversely of the automobile according to the convenience of the driven and when in the desired position nuts 52 can be tightened to secure the mounting assembly to the legs 39 and 40. The vertical portion 42 has holes 53 through which bolts 54 extend. The bolts 54 also extend through elongated oversize slots 55 in leg member 56. Each leg member 56 is secured to the floor of the automobile at the hump 26 by bolts 57 and nuts 58. It is apparent that the position of the mounting assembly 20 can be raised or lowered by loosening nuts 54'. As the slots 55 are oversize, that is, slightly wider than the diameter of the bolts 54, the entire assembly 20 can be tilted relative to the leg members 56 and to the vehicle floor 26.

A microphone 59 is shown (FIG. 1) supported on a conventional hook 60 (FIG. 2) secured to the housing portion 24a. The cord 61 is connected at one end of the microphone 59 and extends through an oversize hole provided by a grommet 62 and the other end of the cord 61 plugs into the radio control head 21.

The wall 50 is provided with a cutout 63. A loudspeaker 64 is secured to the wall 50 at the opening 63 by bolts 65. A plug-in type terminal board 66 is secured to the inside of the lower section 25. The terminal board 66 interconnects the various controls and equipments by means of conductors 67.

Figure 10:
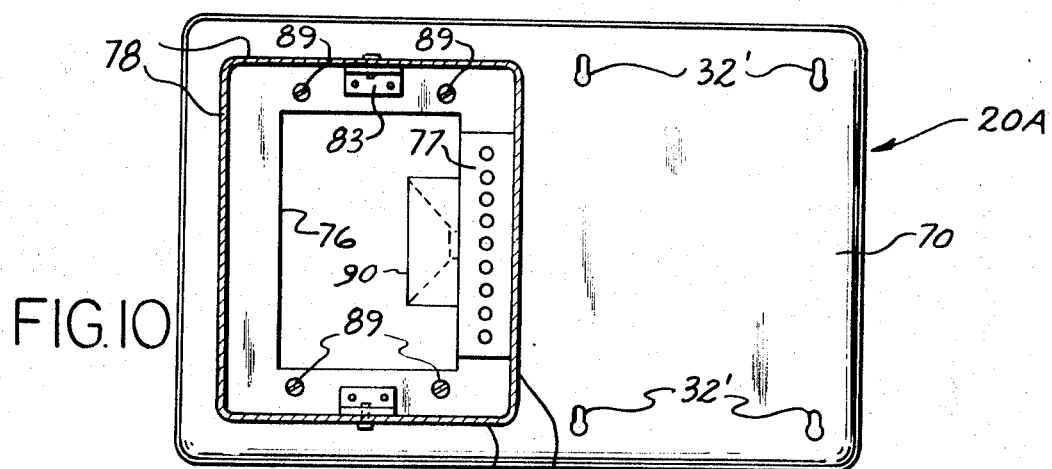
FIG. 10 is a top plan view of an alternative embodiment of the invention.
Figure 11:
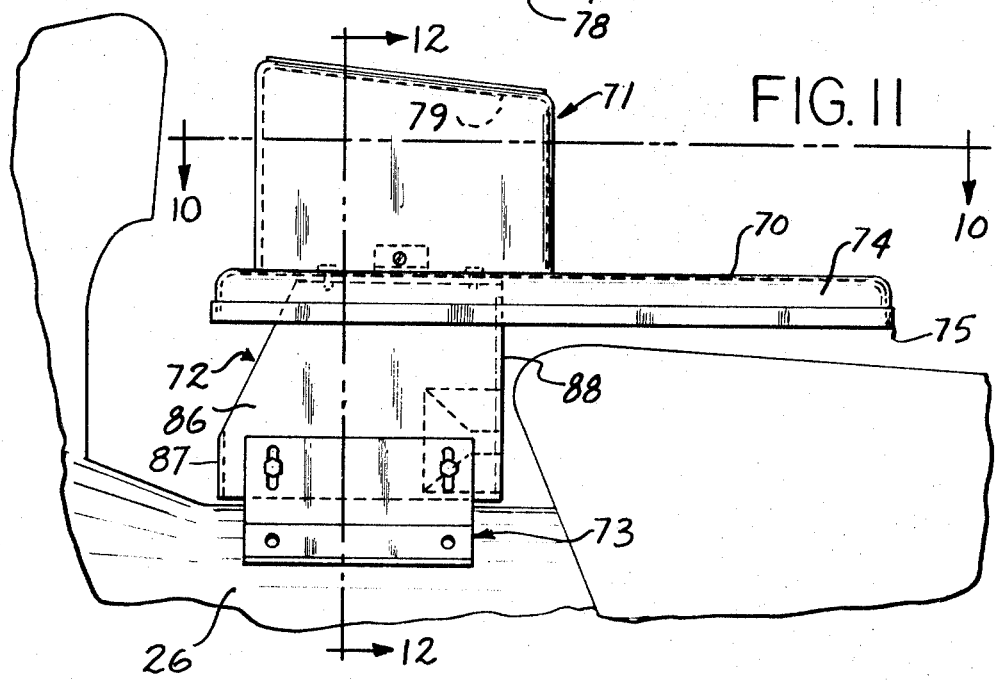
FIG. 11 is a sectional view taken generally along line 11—11 of FIG. 10.
Figure 12:
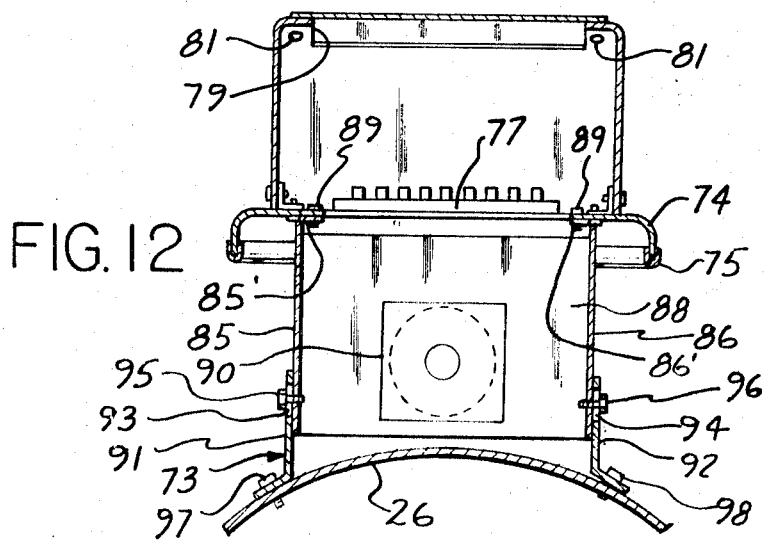
FIG. 12 is a sectional view taken generally along line 12—12 of FIG. 11.

Referring to the embodiment of FIGS. 10, 11 and 12, there is shown a mounting assembly generally indicated at 20A including a plate or platelike member 70, an upper section 71, a lower section 72 secured to the vehicle floor 26 by leg structure 73. The mounting assembly 20A is shown to be in the same position as the mounting assembly 20 shown in the embodiment of FIGS. 1 through 9. The member 70 and sections 71 and 72 are constructed of lightweight metal, but they can be constructed of plastic and formed to the desired contour by vacuum forming or injection molding.

The platelike member 70 is shown to be substantially flat and is provided with a downwardly extending peripheral flange 74. The end of the flange 74 is provided with a covering 75 having a U-shaped cross section. The covering 75 is constructed of extruded plastic and covers the terminal end of the flange 74. The platelike member 70 is provided with four teardrop-shaped slots 32' which are adapted to receive screws which can mount a teleprinter, as for example, the teleprinter shown in FIGS. 1 and 2, or other suitable equipment. The member 70 is also provided with a cutout or opening 76. A plug-in type terminal board 77 is secured to the member 70 adjacent to opening 76.

The upper section 70 is shown to have four generally vertically extending sides 78. The upper end of the section 71 has an opening 79 to which a plate 80 is secured by threaded fasteners 81. The plate 80 corresponds exactly to the plate 33 shown in the embodiment of FIGS. 1 through 9 and mounts the same communications control equipment such as the radio control head, the siren control and switches, and if desired, other equipment such as a selective call unit, the details of which are shown in FIGS. 1, 2, 3, 5, 6 and 9. The lower edge 82 of the section 71 abuts the upper surface of the plate 70. The section 71 is secured to the plate 70 by brackets 83 and 84.

The lower section 72 has opposed side walls 85 and 86 joined to end walls 87 and 88. The upper ends of side walls 85 and 86 are provided with respective flanges 85' and 86'. Threaded fasteners 89 secure the plate 70 to the lower section 72 at the flanges 85' and 86'. A loudspeaker 90 is suitably secured to the end wall 88. Leg structure 73 includes a pair of legs 91 and 92 having respective elongated slots 93 and 94. Bolts 95 and 96 received by the respective slots 93 and 94 can be used to hold the mounting assembly 20A at a selected elevation with respect to the floor 26. As the slots 93 and 94 are slightly wider than the diameters of the bolts 95 and 96 the assembly 20A can be held in a tilted position relative to the floor 26 as may suit the convenience of the user. The legs 91 and 92 are secured to the vehicle floor 26 at the "hump" by bolts 97 and 98.

We claim:

1. For use in a motor vehicle having a floor with a "hump," and seat structure mounted on said floor; a mounting assembly for housing communications control equipment, said mounting assembly being secured to said vehicle floor at said "hump" and including a platelike member, an upper section mounted on the upper side of said platelike member for housing communications control equipment, a lower section for mounting said plate-like member, and means for securing said lower section to said vehicle floor, said plate-like member extending substantially beyond said upper section to provide a shelf disposed in overlying relation to said seat structure.

2. The invention as defined in claim 1, said upper section having an opening, a plate secured to said upper section at said opening, and means mounting communications control equipment to said plate.

3. The invention as defined in claim 1, including means for stiffening said platelike member.

4. The invention as defined in claim 1, including a loudspeaker mounted by said lower section.

* * * * *